(12) United States Patent
Borthwick et al.

(10) Patent No.: US 11,314,730 B1
(45) Date of Patent: Apr. 26, 2022

(54) MEMORY-EFFICIENT STREAMING COUNT ESTIMATION FOR MULTISETS

(71) Applicant: Amazon Technologies, Inc., Seattle, WA (US)

(72) Inventors: Andrew Borthwick, Kirkland, WA (US); Stephen Michael Ash, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 16/828,188

(22) Filed: Mar. 24, 2020

(51) Int. Cl.
 *G06F 16/23* (2019.01)
 *G06F 16/22* (2019.01)
(52) U.S. Cl.
 CPC ...... *G06F 16/2379* (2019.01); *G06F 16/2255* (2019.01)
(58) Field of Classification Search
 CPC .................. G06F 16/2379; G06F 16/2255
 See application file for complete search history.

(56) References Cited

PUBLICATIONS

Eydi et al., Buffered Count-Min Sketch 2008, Springer, IAT 2017, pp. 249-55.*
Dimitropoulos et al., The Eternal Sunshine of the Sketch Data Structure 2008, Computer Networks 52(17), pp. 3248-3257.*
Medini et al., Extreme Classification in Log Memory using Count-Min Sketch: A Case Study of Amazon Search with 50M Products Oct. 28, 2019, arXIV:1910.13830.*

\* cited by examiner

*Primary Examiner* — Jason G Liao
(74) *Attorney, Agent, or Firm* — Nicholson De Vos Webster & Elliott LLP

(57) ABSTRACT

Techniques for memory-efficient streaming count estimation for multisets are described. A method for memory-efficient streaming count estimation for multisets may include obtaining data from a plurality of data sources, and estimating a count for one or more attributes of the data using a telescoping count-min sketch (CMS) data structure, the telescoping CMS including at least a first table and a second table, wherein count values for the data are stored in a plurality of cells of the first table and when a cell of the first table is saturated, the count values for that cell are stored in a corresponding cell of the second table determined based at least on the cell of the first table.

20 Claims, 9 Drawing Sheets

MEMORY-EFFICIENT STREAMING COUNT ESTIMATION FOR MULTISETS

BACKGROUND

Data lakes provide a centralized repository for customer data, including structured and unstructured data. This allows customers to store all of their data in whatever formats or types it is available in a single place. However, setting up and managing data lakes today involves a lot of manual, complicated, and time-consuming tasks. This work includes loading data from diverse sources, monitoring those data flows, setting up partitions, turning on encryption and managing keys, defining transformation jobs and monitoring their operation, re-organizing data into a columnar format, configuring access control settings, deduplicating redundant data, matching linked records, granting access to data sets, and auditing access over time. In many big data distributed applications it is useful to be able to count items in a set (i.e., create a multiset). However, when the number of items is many millions or billions of items, it becomes prohibitively expensive to store the entire set of items in memory. Additionally, in distributed systems, multiple sets must be maintained and then merged to determine a count for the entire data set

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for memory-efficient streaming count estimation for multisets. In many big-data distributed applications it is useful to be able to count items in a set (i.e. create a multiset). However, when the number of items is many millions or billions of items, it becomes prohibitively expensive to store the entire set of items in memory. One technique for estimating these counts is to use a data structure called a Count-Min Sketch (CMS). A CMS uses hash functions and a table to approximate the item count. Unfortunately, the CMS data structure uses a fixed bit-width for each counting cell in the CMS' table. If the frequency of items in the set is power distributed (e.g., has a small number of items that appear a large number of times, and a long tail of items that appear a small number of times), then this fixed bit width cell becomes a problem: if the bit width is too small, then the cells saturate for high cardinality elements; if it is too large, then the CMS data structure becomes extremely memory inefficient as most cells are full of small counts, thus most of the bits are zeroes. Since the accuracy of the CMS as a whole is a function of how much memory you allow for the table, this memory efficiency turns into a loss of count accuracy.

According to some embodiments, an improved data structure called a telescoping CMS can be implemented. The CMS can stack sketch tables with differing bit-widths and differing table widths so that more memory bandwidth can be provided to smaller bit-widths (where most of the item counts end up), but then allow the cells to spill over into other sketch tables with higher bit widths and lower table widths. In some embodiments, both dense and sparse representations for the sketch tables may be utilized, by starting with a sparse representation and when enough of the cells are populated, automatically switching to a dense representation. The telescoping CMS improves the memory efficiency of the table while also improving the accuracy of the counts under the same amount of memory.

Figure 1:
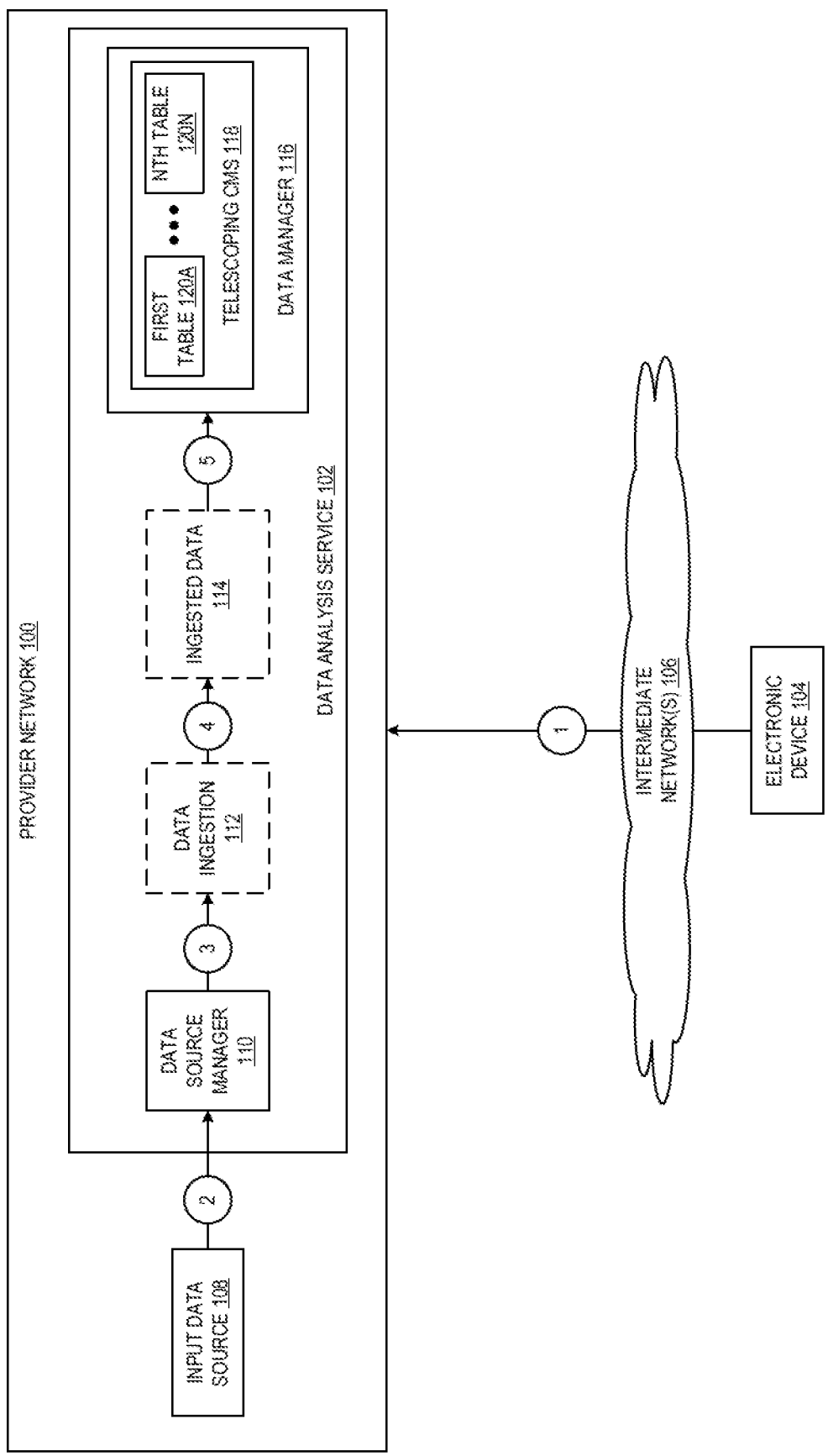
FIG. 1 is a diagram illustrating an environment for memory-efficient streaming count estimation for multisets according to some embodiments.

FIG. 1 is a diagram illustrating an environment for memory-efficient streaming count estimation for multisets according to some embodiments. As shown in FIG. 1, a provider network 100 may include a data analysis service 102. The data analysis service 102 may be used to analyze data obtained from one or more input data sources 108. In some embodiments, as shown at numeral 1, a customer, using electronic device 104, can send a request over one or more intermediate networks 106 to data analysis service 102 to analyze their data. The request may identify the one or more input data sources 108 from which the customer's data is to be obtained. The customer data may be stored in various locations, such as in one or more database services, storage services in provider network 100, streaming endpoints, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown at numeral 2, in response to the request to analyze data from one or more input source(s), a data source manager 110 can obtain the customer data from the input data source(s). The data source manager 110 may be an interface configured to send requests to, and receive data from, one or more endpoints associated with various data sources. Optionally, at numeral 3, the data source manager 110 can pass the data to a data ingestion manager 112. In some embodiments, data ingestion manager 112 can perform one or more operations on the data obtained from the data sources, such as normalization. Normalization may include transformations that remove common typographical variance that is usually unimportant in distinguishing semantic similarity. For example, character casing may be made consistent and some punctuation may be removed or added. Other data normalization techniques may also be applied to other types of input data. Once the data has been ingested, at numeral 4, it can be added to ingested data 114. Ingested data 114 may represent the customers data as added to storage nodes managed by data analysis service 102. In some embodiments, ingested data 114 may be added to a new storage location in a storage service provided by provider network 100, that is owned by data analysis service 102. In various embodiments, the ingested data may be stored to a plurality of storage locations in the data analysis service. The storage locations may correspond to different underlying storage nodes, such as different physical hosts having local storage media allocated to storing ingested data. The ingested data may be stored arbitrarily across these nodes. For example, as data is streamed in and ingested, the ingested data may be stored to a first storage node and when the first storage node is full the ingested data may be stored to a second storage node, and so on. As such, the ingested data is not sorted prior to storage or stored to a particular storage node based on any attributes of the ingested data.

At numeral 5, a data manager 116 can analyze the ingested data using a telescoping count-min sketch (CMS) data structure 118. Data manager 116 may be a service implemented by data analysis service 102 which has access to each storage node on which ingested data is stored. In some embodiments, a different instance of the data manager may be implemented on each storage node, such that a data manager instance is co-located with the data which it is analyzing. Alternatively, in some embodiments, data obtained from input data sources 108 can be streamed to data analysis service 102 and analyzed by data manager 116 without first ingesting or storing the data. As discussed, various big data applications may use a count of items, or attributes of items, in a set. Having an estimate of the counts of items in a data set with high cardinality is use in a number of applications, such as intersection dynamic blocking, as discussed further below with respect to FIG. 2. As discussed, the ingested data may be stored arbitrarily on multiple computing devices that host the data analysis service and/or storage service of the provider network 100. As such, all of the relevant data being counted is not likely on a single computing device. One technique would be to use a hash map on each computing device, but then these hash maps have to be reduced to get the count of the entire data set across the multiple computing devices. Additionally, the reduced map may be too large for a single computing device. Instead, a CMS data structure can be used. A CMS is a probabilistic data structure which indicates the frequency at which items appear in input data. Instead of a hash map, where the keys are the data elements, instead the keys are hashed, and a counter is maintained per hash.

If a single hash is used, then there is a risk that different keys share the same hash value, resulting in a collision. In such cases, the count retrieved for one key will also include the counts of a different key which shared the same hash value, resulting in an overcount. As such, to increase accuracy, multiple hashing algorithms may be used, and the lowest count from each of the hashing algorithms is used as the count for the key. This means a key can never be undercounted, though there is a risk of overcounting if all of the hashing algorithms result in collisions. The size of the CMS data structure on each computing device can be managed by controlling the number of hashing algorithms used and/or the table width of the sketch tables to ensure that the multiple CMS data structures can be reduced to provide the count estimate of the entire data set. However, reducing either of these variables also necessarily reduces the accuracy of the count. For example, reducing the table width increases the risk of collisions, by reducing the number of cells into which counts can be placed. Likewise, reducing the number of hashing algorithms increases the probability of overcounting.

Additionally, as discussed, for some data distributions, the fixed cell bit width of traditional CMS data structures is memory inefficient. The CMS data structure is a table with a depth, d, (e.g., a number of rows) and a width, w, (e.g., a number of columns), where each row corresponds to a hashing function and each column corresponds to a counter. When indexed by row and column, each cell includes a count for at least one item (a single item if there are no collisions). For example, if an input item is "Tom Smith," this item would be hashed using a hashing algorithm associated with one row of the CMS, the modulo of the hash value and w can then be calculated to identify the cell to be used for counting that input item. This can then be repeated for each row (e.g., hashing algorithm) in the CMS. Hashing algorithms may be chosen to be independent of each other (e.g., to have a very low probability that the same input value hashes to the same value). By using multiple hash functions, the probability that collisions occur across all hash functions is reduced, yielding a more accurate count.

The CMS data structure is defined in advance (e.g., the number of rows and the columns, as well as the cell width in bits, are all predefined). As such, if a CMS is defined as d=3 and w=10000, then the data structure has 30000 cells. If each cell is 32 bits, then the table is 120000 bytes. This both limits the counting of any particular item to 32 bits, and also means if many items do not appear often enough to count up to 32 bits, then much of the table will be wasted in memory. As discussed, reducing any of the d, w, or the cell width of the CMS data structure reduces the accuracy of the resulting estimate. This reduction is nonlinear, as collisions will begin to cascade as the size of the data structure is reduced.

To address these shortcomings, embodiments use a telescoping CMS 118. The telescoping CMS may include a plurality of tables 120A-120N. The first table 120A has the largest table width w and the smallest cell width. Each subsequent table has a smaller w and a larger cell width. When a cell is saturated, the counts for that item can overflow into a second table, when the cell in the second table is saturated, the counts for that item can overflow into a third table, and so on. For example, the first table 120A may be a bit map (e.g., a cell width of 1 bit), and the second table may have a cell width of 8 bits. When an item is counted once, its corresponding cell in the first table is saturated because it is a bitmap. Any subsequent counts overflow into a cell of the second table. If the item is counted enough times to saturate the 8 bits of the cell in the second table, then subsequent counts overflow into a third table, and so on. As such, the telescoping CMS 118 provides a more memory efficient representation of the estimated counts of data sets having a large number of items that appear a few times, and a small number of items that appear a large number of times, without sacrificing accuracy. As discussed, multiple telescoping CMSs may be generated, each co-located with a different portion of the data set being counted. Once each portion of the data set has been counted, these multiple telescoping CMSs can be merged into one telescoping CMS which represents the entire data set.

Figure 2:
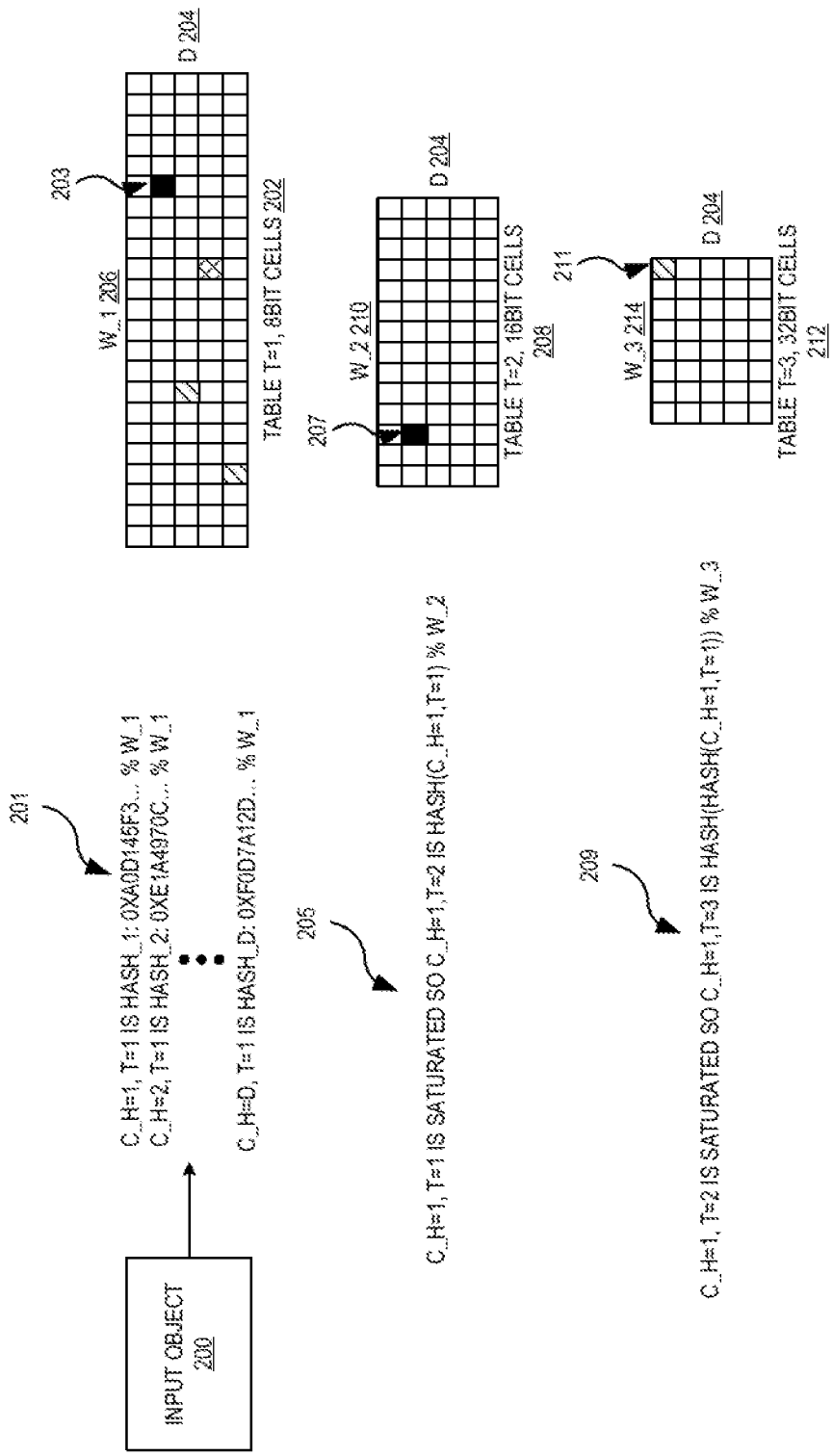
FIG. 2 is a diagram illustrating a telescoping count-min sketch data structure according to some embodiments.

FIG. 2 is a diagram illustrating a telescoping count-min sketch data structure according to some embodiments. As shown in FIG. 2, an input object 200 may be one item from an input data source. The item may be text data, such as a key representing a record from a database, or other data representing a record from the input data source. In some embodiments, the item may be any input data having one or more attributes which may be counted and represented using the telescoping CMS. A plurality of hash values can be calculated 201 for the input object. Each hash calculated from a different hashing algorithm C_H which corresponds to a different row of table 1 202. As shown, table 1 has d rows 204, each corresponding to a different hashing algorithm, and w_1 columns 206 corresponding to the number of cells in each row. In the example of FIG. 2, the cell width of each cell is 8 bits, enabling an item to be counted up to 256 times.

Once a cell has been saturated (e.g., the corresponding item has been counted 256 times), such as cell 203, subsequent counts can overflow into a cell in table 2 208. Table 2 208 has the same d columns, corresponding to the same hashing algorithms, but w_2 210 is smaller than w_1 206. As a result, table 2 has fewer cells than table 1. Additionally, the bit width of table 2 is larger than that of table 1. In the example of FIG. 2, table 2 has a bit width of 16 bits. Overflow counts for this item can continue to be written into table 2 until this cell is also saturated, as shown at 207. The overflow counts from table 2 may then be written into a cell in table 3. Table 3 similarly has the same d value 204, but has a larger bit width (in this example 32 bits) and w_3 214 is smaller than w_2. Subsequent telescoping tables may continue to be generated, each with a smaller value of w and a larger bit width than the previous table, until the data has been counted and no cells are saturated.

Although the example of FIG. 2 shows tables having bit widths of 8, 16, and 32 bits, embodiments can have any bit width to suit the data being counted, so long as the bit widths increase with each subsequent table. Similarly, the value of w may also be tailored to the data being counted, so long as w decreases with each subsequent table.

As discussed, in table 1, the cell for a particular item can be determined by calculating the modulo of the hash value and w_1. When a cell becomes saturated, the cell in table 2 to which the overflow counts are to be written can be determined by calculating the modulo of a hash of the cell number from table 1 and w_2, as shown at 205. Similarly, for each subsequent table, the cell of the subsequent table can be determined by calculating the modulo of the hash of the cell number from the previous table and the w value of the subsequent table, as shown at 209. As a result, cell 203 of table 1 can be determined to overflow into cell 207 of table 2, and cell 207 of table 2 can be determined to overflow into cell 211 of table 3. This is useful when merging multiple telescoping CMS tables generated by separate tasks or storage instances, as discussed further with respect to FIG. 5.

Figure 3:
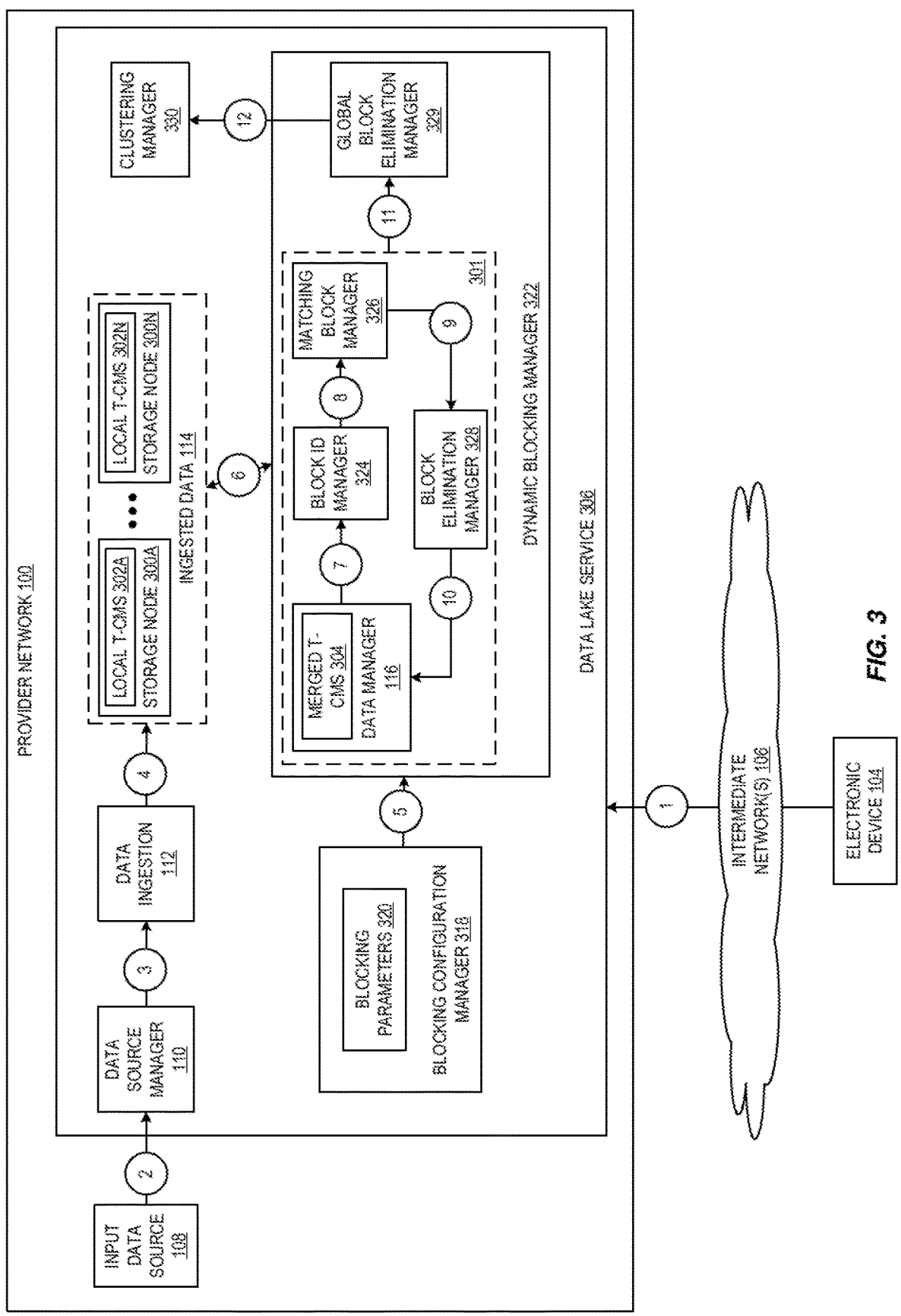
FIG. 3 is a diagram illustrating an example of intersection dynamic blocking using memory-efficient streaming count estimation according to some embodiments.

FIG. 3 is a diagram illustrating an example of intersection dynamic blocking using memory-efficient streaming count estimation according to some embodiments. As shown in FIG. 3, a provider network 100 may include a data lake service 306. Data lakes provide a centralized repository for customer data, including structured and unstructured data. This allows customers to store all of their data, in whatever formats or types the data is available, in a single place. A data lake service 306 can manage data ingestion, cleaning, cataloging and other services of the customer's data in the data lake. In some embodiments, as shown at numeral 1, a customer, using electronic device 104, can send a request over one or more intermediate networks 106 to data lake service 306 to add their data to a data lake. The customer data may be stored in various locations, such as in one or more database services or storage services in provider network 100.

As shown at numeral 3, in response to the request to import data from one or more sources to the customer's data lake, a data source manager can obtain the customer data from database service and/or storage service. The data source manager may be an interface configured to send requests to, and receive data from, one or more endpoints associated with database service and/or storage service. At numeral 3, the data source manager 110 can pass the data to a data ingestion manager 112. In some embodiments, data ingestion manager 12 can perform one or more operations on the data obtained from the data sources, such as normalization. Normalization may include transformations that remove common typographical variance that is usually unimportant in distinguishing semantic similarity. For example, character casing may be made consistent and some punctuation may be removed or added.

Once the data has been ingested, at numeral 4, it can be added to ingested data 114. Ingested data 114 may represent the customers data as added to a data lake managed by data lake service 306. In some embodiments, ingested data 114 may be added to a new storage location in storage service 110 that is owned by data lake service 306. As shown in FIG. 3, the ingested data 114 may be stored on a plurality of storage nodes 300A-300N. Each storage node may be configured to generate a local telescoping CMS 302A-302N based on the data stored on that node. For example, in some embodiments, each storage node may include an instance of a data manager 116 which generates the local telescoping CMS.

When a customer adds data from multiple sources, they may have various similar, but not identical records, that refer to the same real-world entity. Data lake service 306 can perform approximate record matching and/or database deduplication on the customer's ingested data 114. The initial step is to perform blocking, which involves finding candidate pairs of records that are potential matches for further processing so that the system does not have to compare all ($_2^n$) pairs of records. In some embodiments, dynamic blocking manager 318 can implement intersection dynamic blocking techniques to ensure acceptable sized output blocks are produced that do not include duplicates.

Dynamic blocking can identify, for every record, a least restrictive combination of blocking key values that can be used to identify possible matches for that record. In this way, a more common blocking key value would be dynamically required to block on more field values to be produced as a candidate pair, whereas rare blocking key values that are already distinguishing do not need to block on additional values. Blocking configuration manager 318 can determine blocking parameters 320 to be used to perform dynamic blocking. In some embodiments, the blocking parameters may be determined automatically based on the ingested data and feedback received from the customer. In some embodiments, the blocking parameters 320 may be provided by a customer, administrator, or other entity to be used to perform dynamic blocking. At numeral 5, the blocking parameters can be passed to dynamic blocking manager 322 to perform dynamic blocking. In some embodiments, the blocking parameters can include a list of columns to be used as blocking keys, a parameter indicating the maximum block size that represents a maximum number of records in a block that dynamic blocking manager 322 should emit, and a designation of the columns on which Locality Sensitive Hashing (LSH) blocking keys are to be generated.

At numeral 6, dynamic blocking manager 322 can obtain sets of records. As discussed, blocking may include performing a pairwise comparison of records. However, if a first set A includes the records (A, B, C, D, E) and a second set B includes the records (B, C, D), then performing an all pairs comparison of both sets will result in duplicative work, as the comparison of set B is a subset of the comparison of set A. Such duplication of work can become prohibitive in large datasets with similar blocks. As such, embodiments identify the sets within it that are not a subset of any other set to be used to perform blocking. When a block is identified as a subset, or approximate subset, of another block, it can be discarded.

Numerals 7-10 illustrate an iterative intersection dynamic blocking loop 301 in which blocks that are identified as a subset or approximate subset of another block are discarded. A data manager 116 can analyze the ingested data using a telescoping count-min sketch (CMS) data structure. This may include merging the local telescoping CMSs 302A-302N from each storage node of the invested data 114 to generate a merged telescoping CMS 304. The resulting merged telescoping CMS 304 can include an approximate count for each item in ingested data 114. Block identification manager 324 can identify blocks using a dynamic blocking technique, such as intersection dynamic blocking. At numeral 8, these blocks can be passed to matching block manager 326 which can identify matching blocks using Jaccard similarity, or other similarity metrics. For example, the matching block manager can determine the Jaccard similarity index of two blocks as:

$$Jaccard(B_1, B_2) = \frac{|B_1 \cap B_2|}{|B_1 \cup B_2|}$$

If the Jaccard similarity of two or more blocks is above a threshold value, then at numeral 9 these blocks can be passed to block elimination manager 328. Block elimination manager can select one block from the matching blocks to be representative of all of the matching blocks. In some embodiments, the block elimination manager may select the largest block (e.g., the block having the most records) as being representative of the matching blocks. The other blocks may then be deleted (e.g., deduplicated) by the block elimination manager 328. The resulting representative blocks can then be passed to block identification manager 324, at numeral 10, to perform another round of dynamic blocking using the representative blocks.

In some embodiments, after each iteration of the intersection dynamic blocking loop 301 represented by numerals 7-10, the Jaccard similarity threshold used can be reduced. For example, during the initial round of processing, the Jaccard similarity threshold may be high (e.g., 0.9 or higher), such that in the initial round only very similar blocks are deduplicated. By reducing the threshold similarity value in each iteration, more blocks, that are less similar, may be deduplicated, until a minimum threshold has been applied. In some embodiments, the minimum threshold may be 0.5. In some embodiments, users may specify the range of threshold to be used and/or a threshold to be used in each iteration of processing.

If a set of blocking keys has too many records associated with it, then it may be computationally prohibitive to do pairwise combinations of all of the records until the size has been reduced below a threshold size. As such, the pairs of records to be intersected should be selected such that the intersected key is likely to reduce the number of records associated with that key. For example, if all of the records in a data set having last name "Smith" also have first name "Tom," then intersecting these records on "Tom Smith" will not reduce the number of records. The telescoping CMS enables an estimated count of the number of records associated with "Tom" and the number of records associated with "Smith" to be obtained prior to performing the intersection. If the estimated number of records associated with the intersection is below a threshold value, then the intersection can be performed in the dynamic blocking loop 301. In some embodiments, prior to performing a new intersection, a new telescoping CMS can be generated on each iteration of the dynamic blocking loop based on, for example, different attributes of the ingested data (e.g., different blocking parameters setting different columns to be used as keys and therefore to be counted, etc.).

Optionally, in some embodiments, at numeral 11 a global block elimination manager can globally analyze blocks that are produced as a result of all iterations, or several iterations, of the intersection dynamic blocking loop 301, to determine whether any of these output blocks are exactly subsumed by any other output blocks. A block that is exactly subsumed by another block is redundant and therefore may be eliminated from further processing. In some embodiments, global block elimination manager can obtain the set of output blocks generated by all of the iterations of loop 301 and can partition this set into two subsets $S_r$ and $S_d$. The blocks added to $S_d$ can be safely discarded because they have a high level of subsumption by sets in $S_r$. Subsumption of a set, u, by another set, t, can be defined based on the fraction of elements of u that are included in t, and the cardinality of t relative to u (e.g., the number of elements in t relative to the number of elements in u). For example, pairwise subsumptions can be detected by comparing the number of co-occurrences of each pair of sets t and u with the size of t and u. The global block elimination manager 329 can identify block identifiers associated with each record. It may then emit all pairs of block IDs for each record and count the frequency of each pair. Thus, a frequency of each pair of sets can be determined and from that frequency it can determine whether a block is subsumed by another block.

Once an end condition has been reached (e.g., if all resulting blocks are below the maximum block size parameter, or if the minimum similarity threshold has been applied, etc.), then the resulting blocks can be passed to clustering manager at numeral 12. In some embodiments, if any resulting blocks still exceed the maximum block size, then these blocks may be discarded prior to sending the resulting blocks to the clustering manager Clustering manager 130 can implement a matching algorithm, such as a pairwise matching algorithm and a clustering algorithm, such as transitive closure clustering, to identify matching records based on the resulting blocks. In some embodiments, the matching algorithm can be used to determine a probability that each pair of records of each resulting block provided by dynamic blocking manager 322 is a match. Based on the probabilities, a sparse weighted graph can be constructed in which the vertices correspond to input records and the weighted edges are the pairwise similarity score. The clustering algorithm can partition this graph into non-overlapping clusters of records such that each partition corresponds to a real-world entity.

Figure 4:
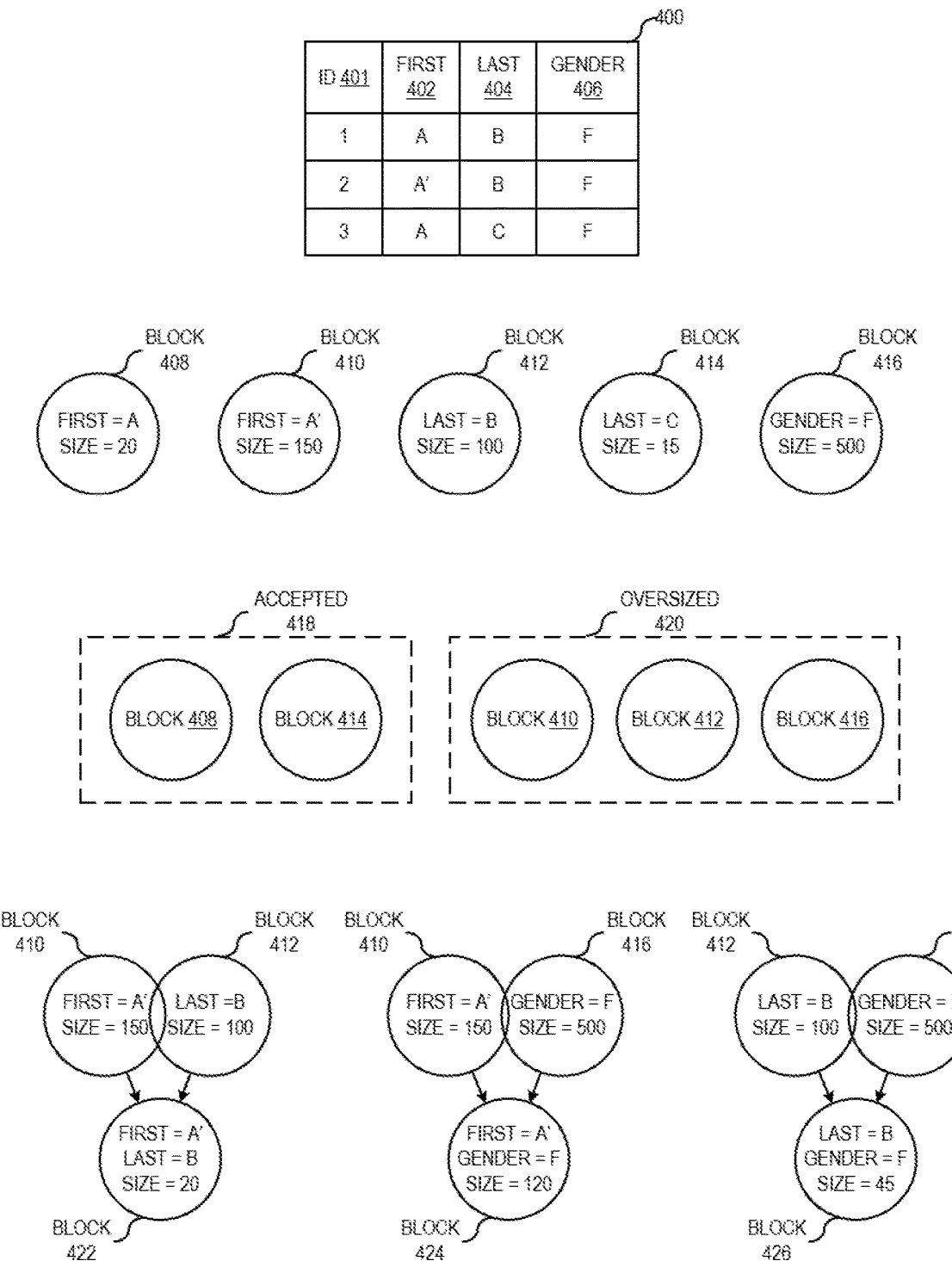
FIG. 4 is a diagram illustrating an example of intersection dynamic blocking according to some embodiments.

FIG. 4 is a diagram illustrating an example of intersection dynamic blocking according to some embodiments. Dynamic blocking can identify, for every record, a least restrictive combination of blocking key values that can be used to identify possible matches for that record. In this way, a more common blocking key value would be dynamically required to block on more field values to be produced as a candidate pair, whereas rare blocking key values that are already distinguishing do not need to block on additional values. A sample of records 400 shown in FIG. 4 can include a column of identifiers 401, a column of first names 402, a column of last names 404, and a column of genders. For example, the records 400 may correspond to employee records, or other records identifying people. In an initial round of blocking, blocks may be created by blocking on the value of each respective key. In this example, first, last, and gender columns have each been identified by the blocking parameters as being columns from which blocking keys may be generated. For example, five blocks may be generated 408-216, each based on the different values of each key. For example, block 408 includes all records from records 400 that include a value of first name=A, block 410 includes all records from records 400 that include a value of first name=A', etc. The size of each block corresponds to the number of records in that block. Each block can be hashed to a block identifier and the blocks can be separated into acceptable sized blocks 418 (e.g., blocks smaller than or equal to the maximum block size parameter) and oversized blocks 420 (e.g., blocks larger than the maximum block size parameter). In the example of FIG. 4, the maximum block size parameter is 50, making blocks 408 and 414 acceptable, and blocks 410, 412, and 416 oversized.

Oversized blocks 420 can be intersected with each other to further reduce the blocks. The intersected blocks can include multiple blocking values, from the two parent blocks. For example, block 410 and block 412 can be intersected to create block 422, with blocking keys from the first name and last name columns, blocks 410 and 416 can be intersected to create block 424, with blocking keys from the first name and gender columns, and blocks 412 and 416 can be intersected to create block 426, with blocking keys from the last name and gender columns. The resulting blocks can be hashed into new block identifiers. The new blocks that are below the max block size can then be output by the dynamic blocking manager. In some embodiments, blocks that still exceed the max block size parameters can continue to be intersected with other blocks. In some embodiments, after a number of iterations, any blocks that are still too large (e.g., block 424) may be discarded if the block size cannot be reduced below the max block size parameter.

Figure 5:
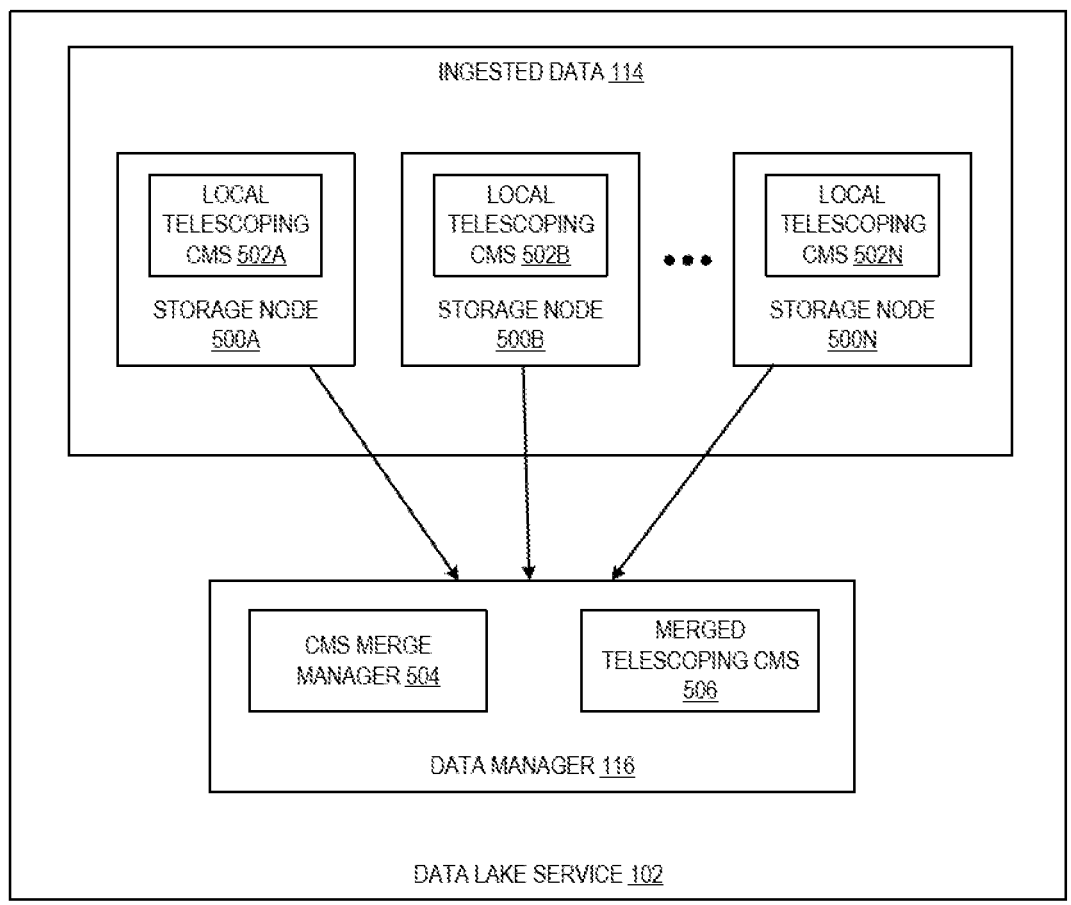
FIG. 5 is a diagram illustrating an environment for merging multiple telescoping count-min sketch data structures according to some embodiments.

FIG. 5 is a diagram illustrating an environment for merging multiple telescoping count-min sketch data structures according to some embodiments. As shown in FIG. 5, ingested data 114 may be stored on a plurality of storage nodes 500A-500N. The data may be stored to these nodes arbitrarily (e.g., data is not stored to a particular node based on the characteristics of the data itself). As discussed, each storage node can maintain its own local telescoping CMS 502A-502N which each includes counts for the items stored on that storage node. To obtain the count of any particular item in the ingested data, these local telescoping CMS data structures can be merged into a merged telescoping CMS data structure 506 by data manager 116. The data manager 116 can include a CMS merge manager 504 can obtain each local telescoping CMS 502A-502N and merge the counts into the merged telescoping CMS 506.

Figure 6:
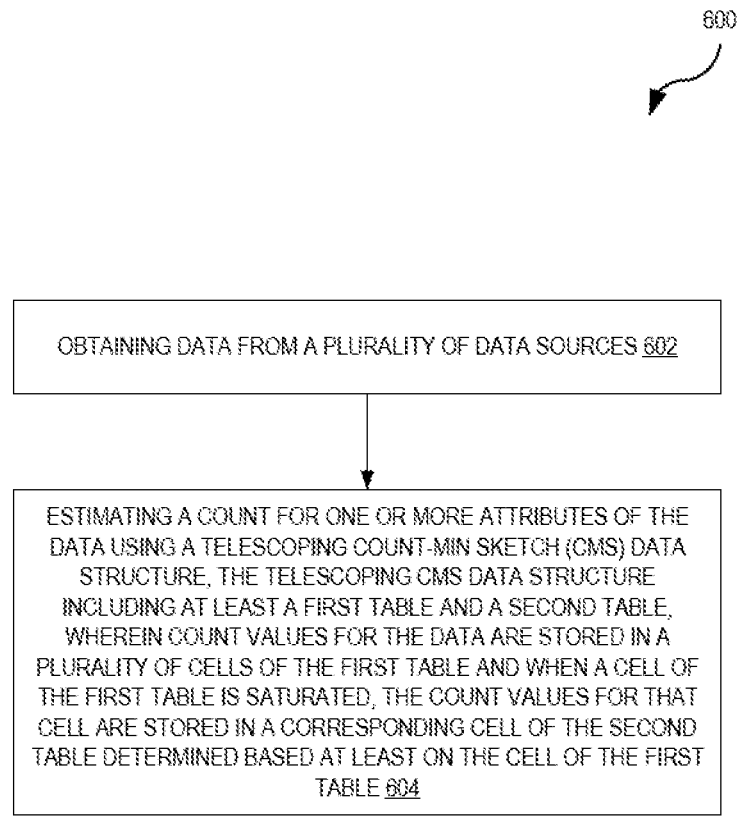
FIG. 6 is a flow diagram illustrating operations of a method for memory-efficient streaming count estimation for multisets according to some embodiments.

As discussed, in the initial table of the telescoping CMS, counts are stored in a cell which is determined by calculating the modulo of a hash of the input value and the table width of the initial table. The cells of an earlier table can spillover into cells of a subsequent table, where the cell of the subsequent table is found by determining the modulo of the cell number from the earlier table and the table width w of the subsequent table. When merging multiple telescoping CMSs, each corresponding table from the CMSs are merged. For example, the initial table from each CMS is merged, the second table from each CMS is merged, etc. If in the course of merging these tables, a cell becomes saturated, then the count overflows to a cell of the subsequent table. By using the cell number of the saturated cell to identify the overflow cell of the next table, multiple CMSs can be successfully merged without needing access to the original hash values that were used in the initial table. one of these In some embodiments, merging may be performed recursively. For example, if three thousand telescoping CMSs have been generated for data stored on three thousand different storage nodes, merging all three thousand telescoping CMSs may overwhelm system resources. As such, merging may be performed in stages, where three thousand telescoping CMSs can be merged into one thousand telescoping CMSs, which may then be merged into one hundred telescoping CMSs, which may then be merged into a single telescoping CMS. In various embodiments, the number of telescoping CMSs may be based on the number of storage nodes on which the data set is stored, and how quickly these telescoping CMSs are merged may be based on system resources. FIG. 6 is a flow diagram illustrating operations 600 of a method for memory-efficient streaming count estimation for multisets according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by data analysis service 102, data lake service 306, data manager 116, etc. of the other figures.

The operations 600 include, at block 602, obtaining data from a plurality of data sources. In some embodiments, the data sources may include storage services, databases, local data stores, streaming data sources, etc. In some embodiments, the data may be stored in a data lake service in a provider network. The data lake service may include a plurality of storage instances on which the data is stored. In some embodiments, a statistical distribution associated with a frequency of the data is a power distribution. In some embodiments, the data may be streamed to a data analysis service to determine an approximate count of one or more attributes of the data using a telescoping CMS data structure.

The operations 600 further include, at block 606, estimating a count for one or more attributes of the data using a telescoping count-min sketch (CMS) data structure, the telescoping CMS data structure including at least a first table and a second table, wherein count values for the data are stored in a plurality of cells of the first table and when a cell of the first table is saturated, the count values for that cell are stored in a corresponding cell of the second table determined based at least on the cell of the first table.

In some embodiments, a first table width of the first table is larger than a second table width of the second table. In some embodiments, a first cell width of each cell of the first table is smaller than a second cell width of each cell of the second table. In some embodiments, each table of the telescoping CMS data structure has an equal number of rows, each row corresponding to a hashing algorithm independent of the other rows. In some embodiments, the corresponding cell of the second table is determined by calculating a modulo of the cell of the first table and a table width of the second table.

In some embodiments, the operations may further include determining an estimated number of intersecting blocks of the data using the telescoping CMS data structure is below a threshold, and performing intersection dynamic blocking using the blocks of data.

In some embodiments, the operations may further include storing the data in a data lake service in a provider network, wherein the data lake service includes a plurality of storage instances in which the data are stored and, wherein each storage instance generates a local telescoping CMS data structure for a portion of the data stored on that instance. In some embodiments, the operations may further include merging a plurality of the local telescoping CMS data structures generated by the plurality of storage instances to generate a merged telescoping CMS data structure.

In some embodiments, the operations may include identifying a first plurality of blocks based at least on a plurality of records stored in a storage service of a provider network, identifying a plurality of sets of matching blocks from the first plurality of blocks, deleting the plurality of sets of matching blocks except for a first block from each set from the plurality of sets of matching blocks, estimating a count for each record from the plurality of records using a telescoping count-min sketch (CMS) data structure, the telescoping CMS data structure including at least a first table and a second table, wherein count values for the plurality of records are stored in a plurality of cells of the first table and when a cell of the first table is saturated, the count values for that cell are stored in a corresponding cell of the second table determined based at least on the cell of the first table, and iteratively performing dynamic blocking based at least on the telescoping CMS data structure to generate subsequent pluralities of blocks until the subsequent pluralities of blocks are below a threshold size.

Figure 7:
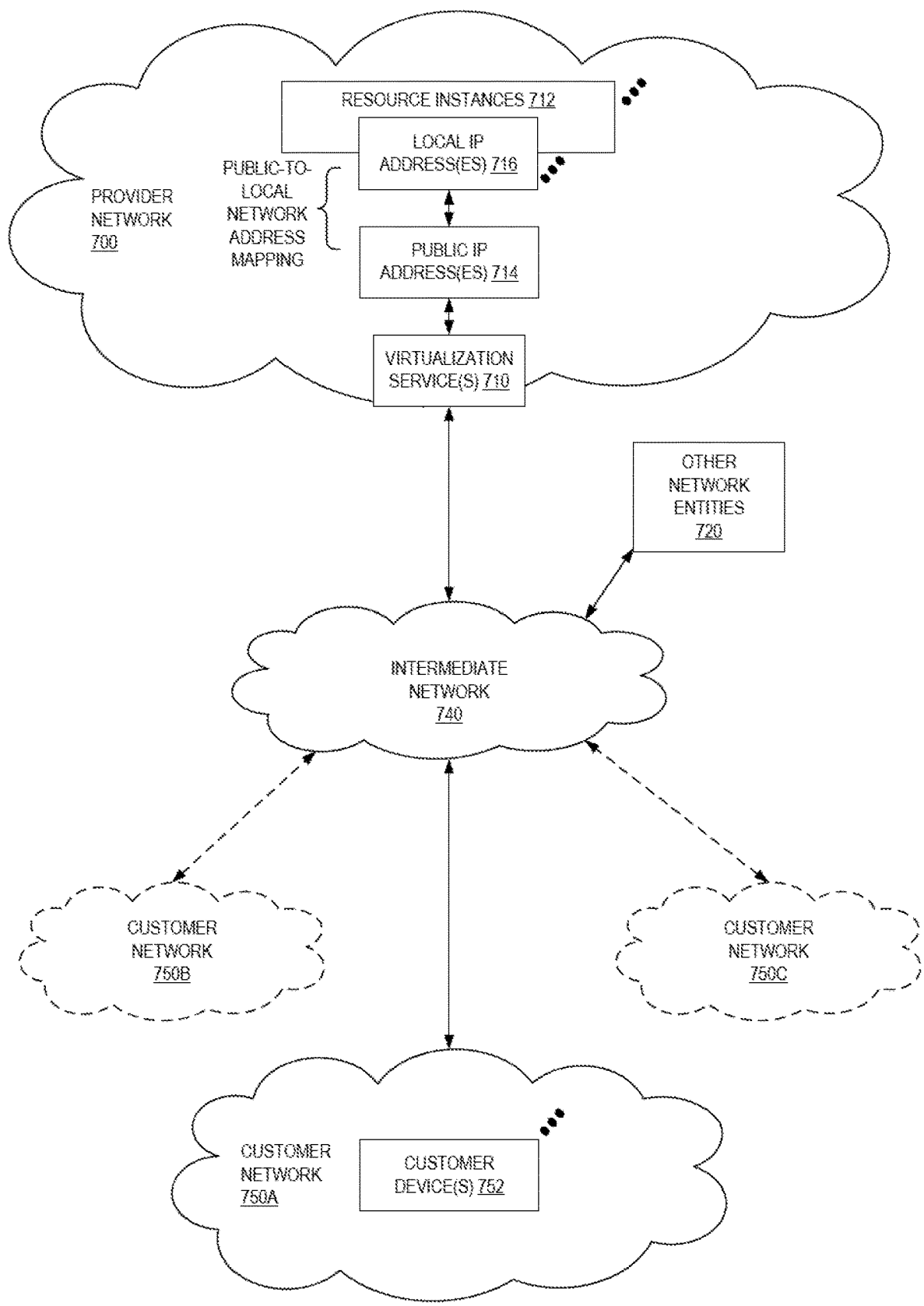
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
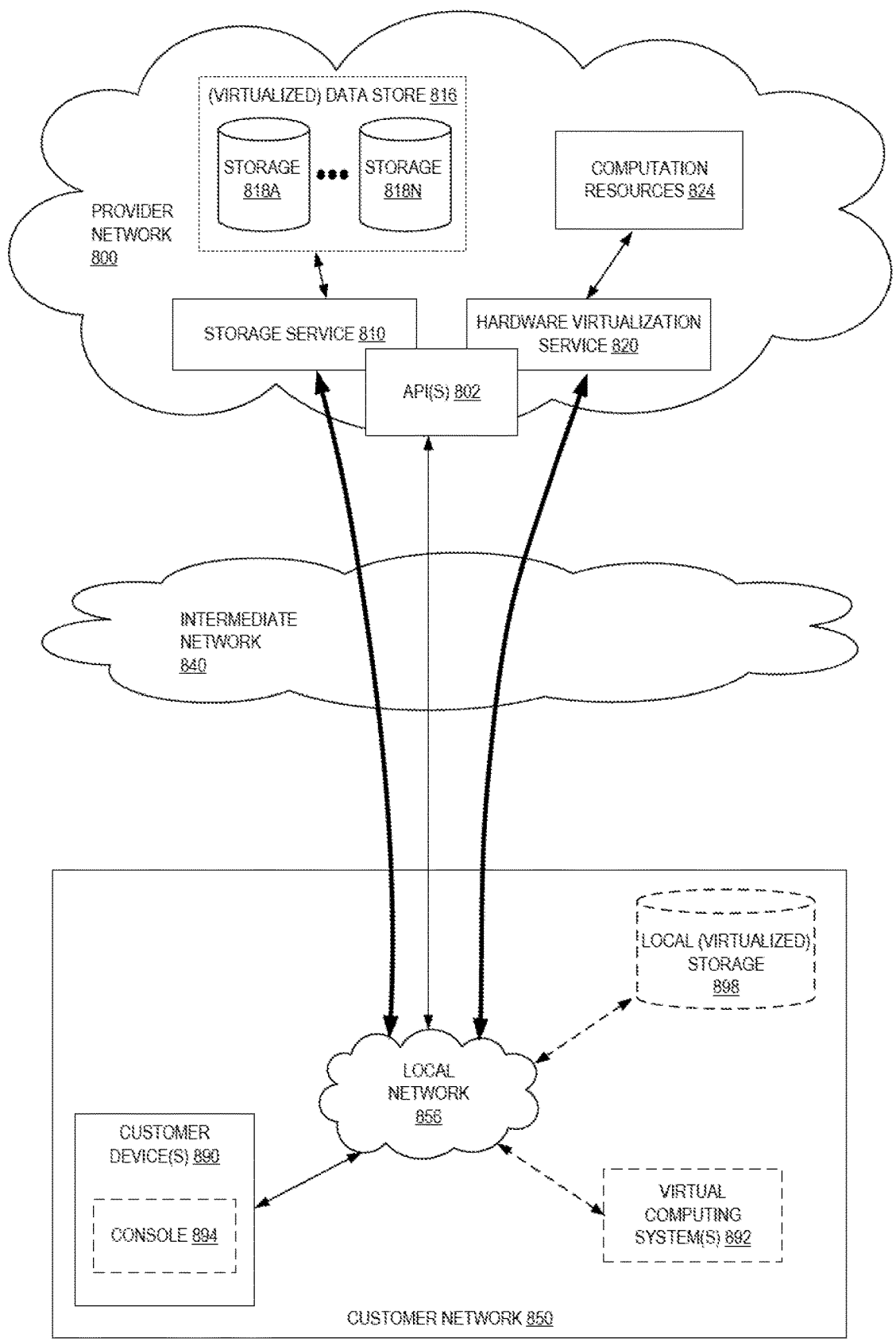
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

Figure 9:
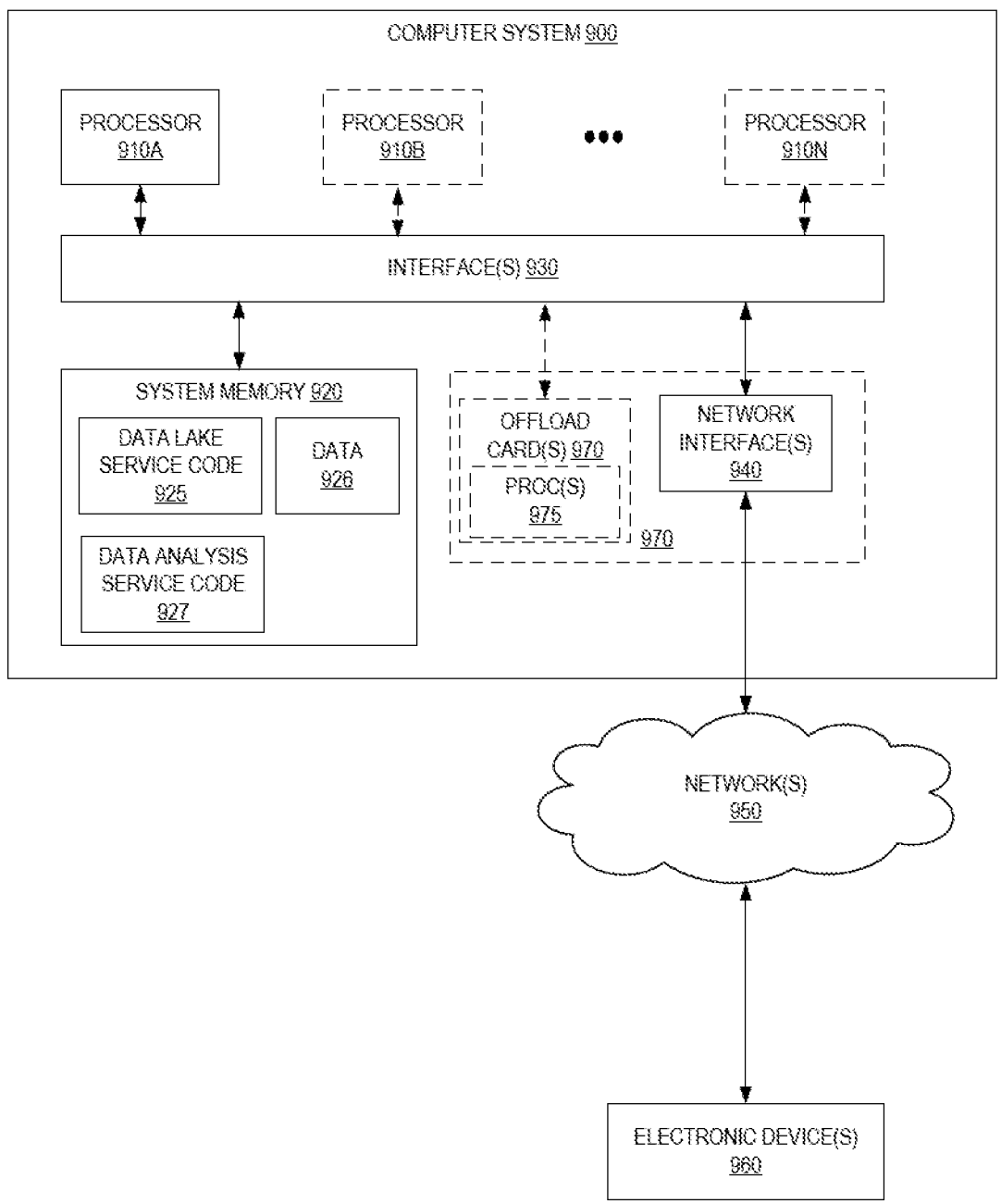
FIG. 9 is a block diagram illustrating an example computer system that may be used in some embodiments.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.
Illustrative Systems In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as data lake service code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   identifying a first plurality of blocks based at least on a plurality of records stored in a storage service of a provider network;
   identifying a plurality of sets of matching blocks from the first plurality of blocks;
   deleting the plurality of sets of matching blocks except for a first block from each set from the plurality of sets of matching blocks;
   estimating a count for each block from the first plurality of blocks using a telescoping count-min sketch (CMS) data structure, the telescoping CMS data structure including at least a first table and a second table, wherein count values for the plurality of records are stored in a plurality of cells of the first table and when a cell of the first table is saturated, the overflowed count values for that cell are stored in a corresponding cell of the second table determined based at least on the cell of the first table; and
   iteratively performing dynamic blocking based at least on the telescoping CMS data structure to generate subsequent pluralities of blocks until the subsequent pluralities of blocks are below a threshold size.

2. The computer-implemented method of claim 1, wherein a first table width of the first table is larger than a second table width of the second table, wherein a first cell width of each cell of the first table is smaller than a second cell width of each cell of the second table, and wherein each table of the telescoping CMS data structure has an equal number of rows, each row corresponding to a hashing algorithm independent of the other rows.

3. The computer-implemented method of claim 1, wherein the corresponding cell of the second table is determined by calculating a modulo of the cell of the first table and a table width of the second table.

4. A computer-implemented method comprising:
   obtaining data from a plurality of data sources; and
   estimating a count for one or more attributes of the data using a telescoping count-min sketch (CMS) data structure, the telescoping CMS data structure including at least a first table and a second table, wherein count values for the data are stored in a plurality of cells of the first table and when a cell of the first table is saturated, the overflowed count values for that cell are stored in a corresponding cell of the second table determined based at least on the cell of the first table.

5. The computer-implemented method of claim 4, wherein a first table width of the first table is larger than a second table width of the second table.

6. The computer-implemented method of claim 4, wherein a first cell width of each cell of the first table is smaller than a second cell width of each cell of the second table.

7. The computer-implemented method of claim 4, wherein each table of the telescoping CMS data structure has an equal number of rows, each row corresponding to a hashing algorithm independent of the other rows.

8. The computer-implemented method of claim 4, wherein the corresponding cell of the second table is determined by calculating a modulo of the cell of the first table and a table width of the second table.

9. The computer-implemented method of claim 4, further comprising:
   determining an estimated number of intersecting blocks of the data using the telescoping CMS data structure is below a threshold; and
   performing intersection dynamic blocking using the blocks of data.

10. The computer-implemented method of claim 4, further comprising:
    storing the data in a data lake service in a provider network, wherein the data lake service includes a plurality of storage instances in which the data are stored and, wherein each storage instance generates a local telescoping CMS data structure for a portion of data stored on that instance.

11. The computer-implemented method of claim 10, further comprising:
    merging a plurality of the local telescoping CMS data structures generated by the plurality of storage instances to generate a merged telescoping CMS data structure.

12. The computer-implemented method of claim 1, wherein a statistical distribution associated with a frequency of the plurality of records is a power distribution.

13. A system comprising:
    a first one or more electronic devices to implement a storage service in a multi-tenant provider network; and
    a second one or more electronic devices to implement a data analysis service in the multi-tenant provider network, the data analysis service including instructions that upon execution cause the data analysis service to:

obtain a plurality of records from a plurality of data sources;

estimate a count for one or more attributes of the data using a telescoping count-min sketch (CMS) data structure, the telescoping CMS data structure including at least a first table and a second table, wherein count values for the data are stored in a plurality of cells of the first table and when a cell of the first table is saturated, the overflowed count values for that cell are stored in a corresponding cell of the second table determined based at least on the cell of the first table.

14. The system of claim 13, wherein a first table width of the first table is larger than a second table width of the second table.

15. The system of claim 13, wherein a first cell width of each cell of the first table is smaller than a second cell width of each cell of the second table.

16. The system of claim 13, wherein each table of the telescoping CMS data structure has an equal number of rows, each row corresponding to a hashing algorithm independent of the other rows.

17. The system of claim 13, wherein the corresponding cell of the second table is determined by calculating a modulo of the cell of the first table and a table width of the second table.

18. The system of claim 13, wherein the instructions, when executed, further cause the data analysis service to:

determine an estimated number of intersecting blocks of the data using the telescoping CMS data structure is below a threshold; and perform intersection dynamic blocking using the blocks of data.

19. The system of claim 13, wherein the instructions, when executed, further cause the data analysis service to:

storie the plurality of records in a data lake service in a provider network, wherein the data lake service includes a plurality of storage instances in which the data are stored and, wherein each storage instance generates a local telescoping CMS data structure for a portion of the data stored on that instance.

20. The system of claim 19, wherein the instructions, when executed, further cause the data lake service to:

merge a plurality of the local telescoping CMS data structures generated by the plurality of storage instances to generate a merged telescoping CMS data structure.

* * * * *